(12) United States Patent
Wittkotter

(10) Patent No.: US 9,916,358 B2
(45) Date of Patent: Mar. 13, 2018

(54) SAMPLE DATA EXTRACTION

(71) Applicant: Erland Wittkotter, Las Vegas, NV (US)

(72) Inventor: Erland Wittkotter, Las Vegas, NV (US)

(*) Notice: Subject to any disclaimer, the term of this patent is extended or adjusted under 35 U.S.C. 154(b) by 0 days.

(21) Appl. No.: 15/629,686

(22) Filed: Jun. 21, 2017

(65) Prior Publication Data

US 2017/0364562 A1  Dec. 21, 2017

Related U.S. Application Data

(60) Provisional application No. 62/352,595, filed on Jun. 21, 2016, provisional application No. 62/522,771, filed on Jun. 21, 2017.

(51) Int. Cl.
*G06F 17/30* (2006.01)
*G06Q 40/04* (2012.01)

(52) U.S. Cl.
CPC .. *G06F 17/30498* (2013.01); *G06F 17/30424* (2013.01); *G06F 17/30551* (2013.01); *G06Q 40/04* (2013.01)

(58) Field of Classification Search
CPC ......... G06F 17/30867; G06F 17/30424; G06F 17/30498; G06Q 40/04
USPC ....................................................... 707/714
See application file for complete search history.

(56) References Cited

U.S. PATENT DOCUMENTS

| | | | |
|---|---|---|---|
| 7,715,827 B2 | 5/2010 | Yoo | |
| 7,908,242 B1 | 3/2011 | Achanta | |
| 8,073,840 B2 | 12/2011 | Smith et al. | |
| 8,631,034 B1 | 1/2014 | Peloski | |
| 9,043,310 B2* | 5/2015 | Liu | G06F 17/30592 707/714 |
| 9,275,155 B1 | 3/2016 | Smith | |
| 9,633,074 B1* | 4/2017 | Sharma | G06F 17/30442 |
| 2006/0009213 A1 | 1/2006 | Sturniolo et al. | |
| 2010/0005054 A1 | 1/2010 | Smith et al. | |
| 2011/0040776 A1* | 2/2011 | Najm | G06F 17/30648 707/766 |
| 2011/0113131 A1 | 5/2011 | Duanmu et al. | |
| 2011/0218978 A1 | 9/2011 | Hong et al. | |
| 2012/0131137 A1 | 5/2012 | Singh et al. | |
| 2012/0209896 A1 | 8/2012 | Raymond | |
| 2013/0254258 A1 | 9/2013 | Agarwalla et al. | |
| 2013/0325747 A1* | 12/2013 | Lee | G06Q 40/06 705/36 R |
| 2013/0339979 A1 | 12/2013 | Hilton | |

(Continued)

OTHER PUBLICATIONS

PCT/US2017/041664, PCT International Search Report and the Written Opinion, dated Sep. 21, 2017.

(Continued)

*Primary Examiner* — Marc Filipczyk

(74) *Attorney, Agent, or Firm* — Kunzler, PC

(57) ABSTRACT

A method for obtaining sample data includes associating data extracted from an incoming query with a key corresponding to an index table file, downloading data based on a filename, offset, and data range obtained from a table entry corresponding to the key, inserting the downloaded data to an inner join between a query table and a big data table, and obtaining data corresponding to a sample from the inner join.

16 Claims, 4 Drawing Sheets

(56) References Cited

U.S. PATENT DOCUMENTS

2014/0188820 A1* 7/2014 Pederson .......... G06F 17/30483
707/693
2017/0206602 A1* 7/2017 Salient .................. G06Q 40/04

OTHER PUBLICATIONS

PCT/US2017/038620, "PCT Notification of Transmittal of the International Search Report and the Written Opinion of the International Searching Authority, or the Declaration", dated Sep. 1, 2017, 15 pages.
U.S. Appl. No. 15/629,676, Office Action Summary, dated Aug. 25, 2017, 9 pages.

* cited by examiner

SAMPLE DATA EXTRACTION

RELATED APPLICATIONS

This application claims priority to U.S. provisional application 62/352,595 filed on 21 Jun. 2016. This application also claims priority to U.S. provisional application 62/522,771 filed on 21 Jun. 2017.

The above applications are incorporated herein by reference in their entirety.

BACKGROUND OF THE INVENTION

The claimed invention relates to data sampling in general, and specifically to the process of sampling data for one or more financial instruments.

Agents who deal in financial products such as loans, debt, stock, and bonds, rely heavily on market predictions and the ability to identify patterns and trends which might indicate a favorable transaction opportunity. However, with many day traders utilizing the same approaches, the advantage is lost. Additionally, the activity of many high-frequency or other machine-driven can anticipate and influence the activities of the human agents to take advantage of the approach they use.

SUMMARY OF THE INVENTION

The present invention has been developed in response to the present state of the art, and in particular, in response to the problems and needs in the art that have not yet been fully solved by currently available financial instrument probability systems, apparatuses, and methods. Accordingly, the claimed inventions have been developed to provide data protection systems, apparatuses, and methods that overcome shortcomings in the art.

A method for obtaining sample data includes associating data extracted from an incoming query with a key corresponding to an index table file, downloading data based on a filename, offset, and data range obtained from a table entry corresponding to the key, inserting the downloaded data to an inner join between a query table and a big data table, and obtaining data corresponding to a sample from the inner join.

A computer program product includes a computer readable storage medium having program instructions embodiment therewith. The program instructions are readable/executable by a processor to cause the processor to associate data extracted from an incoming query with a key corresponding to an index table file. The program instructions are readable/executable by the processor to cause the processor to further download data based on a filename, offset, and data range obtained from a table entry corresponding to the key. The program instructions are readable/executable by the processor to cause the processor to further insert the downloaded data to an inner join between a query table and a big data table. The program instructions are readable/executable by the processor to cause the processor to further obtain data corresponding to a sample from the inner join.

A computer system includes a processor, a memory accessible by the processor, and a computer readable medium having instructions encoded thereon to associate data extracted from an incoming query with a key corresponding to an index table file, download data based on a filename, offset, and data range obtained from a table entry corresponding to the key, insert the downloaded data to an inner join between a query table and a big data table, and obtain data corresponding to a sample from the inner join.

It should be noted that references throughout this specification to features, advantages, or similar language do not imply that all the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered as limiting of its scope, the invention will be described and explained with additional specificity and detail through the use of the accompanying drawings, in which.

DETAILED DESCRIPTION OF THE INVENTION

Figure 1:
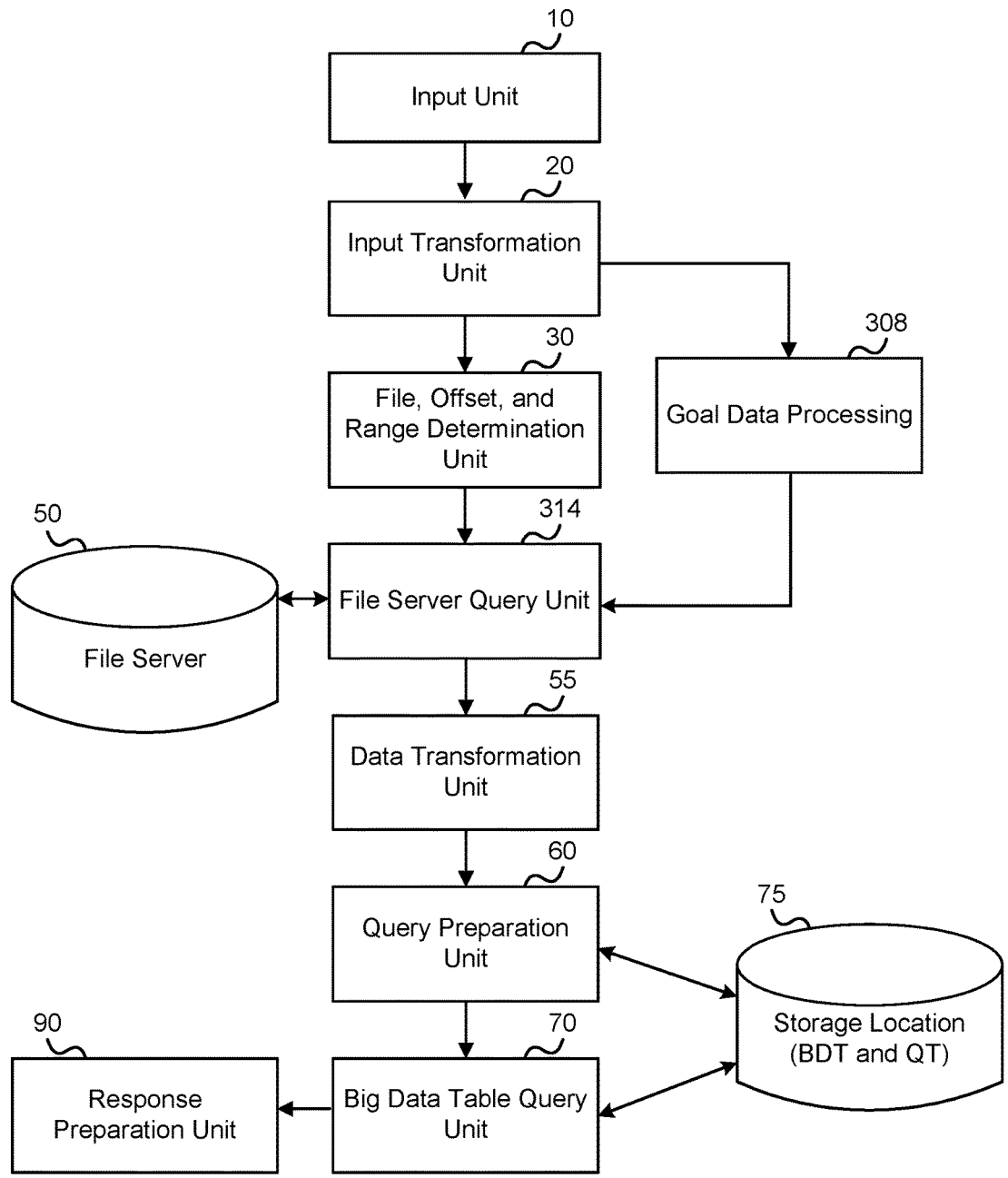
FIG. 1 is a schematic software architecture model to extract sample data.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules to emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The computer program product may be deployed by manually loading directly in the client, server, and proxy computers via loading a computer readable storage medium such as a CD, DVD, etc., the computer program product may be automatically or semi-automatically deployed into a computer system by sending the computer program product to a central server or a group of central servers. The computer program product is then downloaded into the client computers that will execute the computer program product. Alternatively, the computer program product is sent directly to the client system via e-mail.

The computer program product is then either detached to a directory or loaded into a directory by a button on the e-mail that executes a program that detaches the computer program product into a directory. Another alternative is to send the computer program product directly to a directory on the client computer hard drive. When there are proxy servers, the process will, select the proxy server code, determine on which computers to place the proxy servers' code, transmit the proxy server code, then install the proxy server code on the proxy computer. The computer program product will be transmitted to the proxy server and then it will be stored on the proxy server.

The computer program product, in one embodiment, may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally, the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions which identify the unique customer and the type of service for that customer. All the CPU units and other measurements of use that are used for the services for each customer are recorded. When the number of transactions to any one server reaches a number that begins to affect the performance of that server, other servers are accessed to increase the capacity and to share the workload. Likewise, when other measurements of use such as network bandwidth, memory usage, storage usage, etc. approach a capacity to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server, and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product.

Conversely, parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

The computer program product, in one embodiment, may be deployed, accessed, and executed using a virtual private network (VPN), which is any combination of technologies that can be used to secure a connection through an otherwise unsecured or untrusted network. The use of VPNs is to improve security and for reduced operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the computer program product (i.e. the software resides elsewhere) wherein the lifetime of the VPN is limited to a given period of time or a given number of deployments based on an amount paid.

The computer program product may be deployed, accessed, and executed through either a remote-access or a site-to-site VPN. When using the remote-access VPNs the computer program product is deployed, accessed, and executed via the secure, encrypted connections between a company's private network and remote users through a third-party service provider. The enterprise service provider (ESP) sets up a network access server (NAS) and provides the remote users with desktop client software for their computers. The telecommuters can then dial a toll-free number or attach directly via a cable or DSL modem to reach the NAS and use their VPN client software to access the corporate network and to access, download and execute the computer program product.

When using the site-to-site VPN, the computer program product is deployed, accessed, and executed through the use of dedicated equipment and large-scale encryption that are used to connect a company's multiple fixed sites over a public network such as the Internet.

The computer program product is transported over the VPN via tunneling which is the process of placing an entire packet within another packet and sending it over a network. The protocol of the outer packet is understood by the network and both points, called tunnel interfaces, where the packet enters and exits the network.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements.

One problem to be solved is to provide real-time access to samples via filtering multiple, independent time-series, in particular price data for financial instruments, which are characterized by a common feature, in particular a common derivative and/or mathematical feature which is the result of computation. Moreover, the extracted sample elements according to this invention have a common derivative value or multiple common derivative values, which are related to technical indicator values, and which are within an associated value range (i.e. within a quantile) of said technical indicator value or associated to a category value. The goal is to extract, determine and refer to sample events within a sample of time-series in real time and in particular via a query on a DB.

According to the invention price data are e.g. defined via a consecutive sequence of time-frames for which the initial price (Open), the maximum price (High), the minimum price (Low) and the last price (Close) is being given for each time frame, time step or time-slot defined by the corresponding segmentation of time. The price data are derived from actual trades or transactions that have been done within that corresponding time-step or time-slot or are derived from an order-flow.

A time-spot is either the time associated to the open or closing of that time-slot. Additional price or trade related data like volume, open interest, ask, bid, spreads and other data extracted from the trading process are considered according to this invention as price data as well. In general, price data are stored in big data table, in which multiple detailed data are stored within one or more arrays related to a single primary key or stored in a structured file within a filesystem, so that the sequential order of the prices as they happened in reality and within the trading process can be reconstructed and or outputted. A special application of this invention in within financial trading. Additionally, during a trading day, data can come from different trading contexts, like a pre-hour, regular hour or after hour trading. Some financial instruments are traded 24 hours during regular trading days.

The data time frame in which price data are being reported or outputted can be 1 sec, 1 min, 1 hour, 1 day, 1 week or 1 month or any time-frame value in between. In the case that the time-frame is 1 min, there are for stocks about 390 price data points within the regular trading hours. Together with the before and after hour trading 500-800 price data are being generated. Usually a price record with price data is only created when a buy/sell transaction in the corresponding time frame actually happened. According to a convention, a price record with no transaction is being represented by a record in which open price equals high price equals low price equals close price and volume equals 0. Other data like bid-ask spread can change during said time-frame without transactions.

Over a 20 years' time period, a single stock would account for about 2.5 million price records. Under the assumption that about 8,000 stocks are traded in average over the years at the same time, about 20 billion (20 B) price records were already generated for the US stock market alone. In the case the entire system according to the invention would deal with 1 second price data, the system stores and or manages about 1.2 trillion (1.2 T) price data from transactions at stock exchanges in the US alone.

Each price data record is occupying about 50-60 bytes, which means the entire 1 min price data for all stocks from US stock exchanges would require about 1 TB of data storage or about 60 TB of storage for 1 second price data.

For every record of these 20 B or 1 T price data records we can calculate one or more technical indicator values. The indicator values are in predetermined (i.e. selected, calculated, or set by user or by default) indicator value ranges, whereby these ranges can be associated to integer quantiles; a quantile represents thereby a range of values that segments a distribution of values into groups or categories; each value associated to a quantile is always within a predetermined (i.e. selected, calculated, or set by user or by default) indicator value range. An example for a quantile is a percentile. For unbound indicator values, a transformation of said indicator can make the corresponding indicator range bound by a minimum and maximum value. Additionally, unbound indicators, can be segmented in a bound segment and the values above and below said bound segment can be associated to another quantile or within the smallest or largest quantile value.

A data record can also be associated to a category value. A category according to this invention is a division of a given set of elements into subsets based on a common definition for the sub-division and each element within the subset is according to the definition of the sub-division of the same type. Each category can be associated to a name or to a numerical value or symbolic value. Stock Price pattern or candle-stick pattern or bias associations or news event associations or non-numerical metadata associations are associated according to the invention to categories and or sub-divided in sub-categories. If category names of categories or sub-categories are associated to numbers, in particular to integer numbers, then categories are according to the invention associated to quantiles and or can be described or managed by quantiles.

Several, in particular different, technical indicators, and its corresponding indicator values, can be associated to corresponding quantiles and then together associated to an array of quantile values which is then also called a quantile vector. The sequence of values within the vector is being defined by the definition of the quantile vector. Under the assumption that the quantile values for a given indicator are integer values, which always can be done by definition and/or it can be made happen via association of values to integers, all quantile vector elements consist of integers, whereby each quantile value is then from a finite set of that quantile value category. Thereby all possible values within a quantile vector can then be associated to a corresponding quantile ID; moreover, a formula can calculate a unique quantile ID based on the values given in each array-element/field from the corresponding quantile vector.

Additionally, not all indicator values, in particular a predetermined (i.e. selected, calculated, or set by user or by default) range of indicator values are assigned to quantile values, whereby non-assigned indicator values imply that no corresponding quantile-vector is being generated and therefore no probability data are being calculated in the outcome determination unit. Accordingly, the range of acceptable indicator values is being part of the quantile-vector definition and is being used on the client when generating the quantile-vector and on the server or when creating the tables and or the files used to extract samples for examined event with use of said quantile vector value.

In a practical situation, i.e. according to the requirement of a sampling problem, there are e.g. about 2,000 to 1,000,000 or more different quantile vector values associated to one quantile vector definition. Each of this different quantile vector values describes a different context. The question is how can a sample of price data being generated via a DB query if said sought sampling of price records or time-series record for a given quantile vector definition must have the same predetermined (i.e. selected, calculated, or set by user or by default) quantile vector values for at least one price data record within each element of said sample of time-series at least in one time-slot or time-spot.

Furthermore, the question to be solved in this invention is how to get references to sample events referred to the preferably first record within a time-series, i.e. starting with said value, that has the predetermined (i.e. selected, calculated, or set by user or by default) quantile vector value. Additionally, the question to be solved in this invention is how can additional postprocessing of said samples being limited in order to reduce the time of using said samples in further statistical analysis.

Moreover, the goal of the invention is to extract at the same time multiple time-series or also called sample events of a predetermined (i.e. selected, calculated, or set by user or by default) number of price data time-series (i.e. the sample size), whereby at least one price within each sample event record has the same quantile vector as the given via the searched or queried quantile vector or corresponding quantile ID.

In another goal of this invention, the price data record with the same quantile value(s) that is within the sample may be at the beginning of a time-series or at the end of a time series or within a predetermined (i.e. selected, calculated, or set by user or by default) position within a time-series.

The sample size or the number of extracted time-series in a query to a DB is according to the problem of the requirement in the range of none, a few, or of several hundred or in the 10's of thousands of time-series data per quantile vector value query, whereby each time-series data or event within the extracted sample consisting of a time-series or a price data array constitutes a single sample element, or a sample of sample size 1.

The sample size could also be several millions of records in which case a solution according to this invention is segmenting the sample in smaller samples of a size so that a single query to a sample would provide a sample that doesn't require additional size-related post-processing.

Furthermore, the goal according to this invention is to extract the entire sample in real-time, i.e. extracting all sample elements within a fraction of a second after receiving the query with a given quantile vector or quantile ID value. Additionally, the goal of this invention is to keep the cost of the data storage and operation and computation of the solution as small as possible, in particular because storage of data in a database is comparable more expensive, while same applies to the computational costs of querying very large queries using potentially across multiple servers.

None of the existing or published technologies is able to extract derivative samples from an extremely large data structure with a common property that is being defined by derivative and or calculated values. Additionally, none of the existing technologies would be able to deal with a situation in which potentially tens or even hundreds of thousands of different indicator combinations and quantile vector definitions with allowed and used parameters can be defined, and for which it would make no sense to calculate and store all these calculated indicator values in a database and having these indicator values indexed.

Also, the concept of a virtual or calculated column doesn't make sense neither as the computational effort within queries would be too large to get all records for a given quantile vector in a reasonable amount of time.

Furthermore, real-time access to data requires a dedicated index. Although an index per technical indicator setting would help to accelerate the query for a multi-element quantile vector definition, but the additional computational effort to get all the sample records with the same quantile values would be significant and therefore also add to the time which would make a real-time, sub-second query only possible with a massive and an unreasonable high parallelization of that process.

Furthermore, the technical indicators can also be any mathematical operation like derivatives on technical indicators (first or higher order) and or applied on specially weighted combinations of open, high, low, close and volume data, which would make the use of a direct database queries on said data very expensive and very time-consuming.

Therefore, queries of different users which are all using different technical indicators and/or mathematical operators for determining the probabilities or statistical data are currently not doable in real time on existing DB systems.

Even if technical or mathematical indicator values and quantile methods are preprocessed for e.g. for every different quantile vector definition, the management of these data is very cost prohibitive and for querying it, it is still too time-consuming.

So, every query requires a dedicated potentially composite index or a primary key (associated to a reference value that is associated to the different quantile vector values) which is related to the corresponding quantile vector definition. According to a requirement, potentially tens of thousands or even hundreds of thousands of users would need real time access to the price data for the sample generation as a precursor for the outcome determination, then existing system of managing indices in exiting database managements systems are insufficient in providing a solution for this problem.

Furthermore, DB operation and DB storage space is more expensive than regular storage space; a database system which is managing several tens of thousands of indices would potentially extend the storage size of the original price data or big data table by a factor of 1000 even if no additional technical indicator value is managed or stored directly within that database.

The practical situation that is required to be solved is that a multi-terabyte table of records, with 25-1000 billion of records with 10,000s of different indices which are being accessed by 10,000s, 100,000s or even millions of concurrent users in expectation to get real-time access, whereby the calculations and processing of the samples, consisting of 300-10,000 sample events or elements, which each would consists of 200-1000 OHLC price/time-series data is being required to be done in parallel.

Furthermore, it is estimated that every customer is initiating and/or requesting between 100 K and 1 M queries per month to a system according to the invention. Without a new solution, this task is even out of reach for the largest cloud provider. A problem like that is so far not discussed in the big data literature.

The requirements can be summarized: a system according to the invention needs to store and manage the following kinds of data:

1. A very large amount of price data (or in general a big data table)—which requires a fast access to at least 1 min, potentially 1 sec price data (in the financial trading scenario) for one symbol over one or two trading days or a larger trading period of several weeks or months;

2. A very large amount of different index data, whereby only one table is being used per indexing method (which could be equivalent to one index per user or one index per one quantile vector definition as well); this index table is being accessed in real-time in order to extract a larger sample size (with a size of several thousand, but potentially sub-segmented into smaller samples due to the problem that some indicator vectors would have a size of several millions of sample-events) of price data which all have the same quantile vector for at least one time-slot or -spot in common.

3. Only data that are often used should be managed on a server which is then facilitating a fast access to the more detailed time-series data and which is then initiating a highly parallel processing of these sample data.

No published technology is providing a solution for these requirements so that the task of sampling which is done on derivative data computationally derived and processed from original time-series data can be accomplished in real time.

The mostly used approach know to Big Data solutions is to have the algorithms operate close to where the data are stored. This known Hadoop paradigm, which means that calculation is done close to the data source, is not applicable to the above problem as the 2 different types of data (price data table and corresponding index data table) can't be managed and/or operated on one system at the same time due to fact that both data categories are very large.

Furthermore, once a sample is being taken from an index, the size of the extracted data is relatively small so that they can be transmitted to another server for computational operations without concerns for congestions on the electronic data network between these servers.

In a preferred embodiment of the invention, the solution according to the invention consists of a database (DB) means or database unit, which is used to store structured data efficiently and is used to query and receive data in a structured manner, and which can be an object oriented or a relational DB or a DB using SQL or a no-SQL DB. The DB is being used to store for every Quantile Vector record additional records in a table, i.e. it stores for a quantile array consisting of quantile values which are extracted from and related to different indicators and which will be applied to given price data records, i.e. to none, one or several references to samples, whereby said samples are managed on a file server that is storing additional reference data related to each sample in an index-table-file (ITF).

A sample reference linking to a ITF sample consists of a value related to the file or file location in which said sample is being stored and an offset point within said ITF where data are stored within a range that is given by a range value, whereby said sample describing data are used to extract the actual time-series data within the sample from another data storage location.

The database and the file server on which the ITF is being stored are connected via an electronic data network and data are being accessed via a data access means or unit. The Index-table file consisting of multiple samples always beginning at a given and determined byte position within said file and data that are compressed reference values, whereby said reference values are data used to service a corresponding access mean to get to corresponding price data within the price data table or BDT.

The index values related to said sample values can within ITF also be unique key values or position values that are being managed within that ITF file or they are stored on a file-server whereby access to content within the ITF is being provided via a byte-range download of said compressed reference data.

Moreover, the ITF is being managed and stored on a storage means and or unit that is providing ITF a filename, offset value and data range managed within an Index-table file index table which is in the following also called Index-ID table, which is being managed in a preferred manner on a DB means.

According to the invention, the sample means is extracting data from the index-table file or Index-ID table for a given quantile vector value on a means in which it gets said filename, offset and range value, also called sample reference or sample reference values, whereby said unit extracts a single element or a reference to a single sample from a list in which none, one, or many other sample references for a given Quantile ID or quantile vector value is being managed for a given quantile definition. In a preferred embodiment of the invention this Index-ID table can manage quantile ID values from multiple quantile definitions.

According to the preferred embodiment, the already decompressed or data requiring to be decompressed reference data from the ITF representing a sample consisting of sample events are then inserted in a query table within the DB that contains or manages the time-series data. Said query table has preferably an inner join with the time-series data table or BDT whereby this inner join is being queried and said query is providing data via an extraction unit or means that contains all more detailed time-series data or price record data related to said sample.

In another embodiment of the invention the inner join between the query table and the big data table forms a SQL View that is being queried within a query unit. The content of said query consists of records related to the detailed time-series data or price data which are being extracted via a data extraction means or extraction unit that output contains then all the more detailed time-series data related to every sample event of the sample.

In another embodiment of the invention the more detailed time-series data or price record data are being stored and outputted in a binary-to-text transformed and compressed data record or in a binary compressed data record.

The index table file (ITF) is in an embodiment of the invention e.g. a binary file in which the offset points and the range to the next record is being known and managed within the Index-ID table. The content within ITF, i.e. from a given offset point to the end of the data range consists of data associated to references to the big (price) data table (BDT) records. The data associated to references within the data range of said content starts in ITF at the offset point and consists either of a fixed sized list of binary reference values or a compressed content in which the data are stored with additional structure data as known in XML, or JSON or in any other form so that an algorithm can extract between offset point and end of range a list of reference data to other records.

The solution according to the invention is to preprocess all price data with respect to the used technical indicator and the corresponding quantile methods and then storing the result in samples managed and stored within the index-table-file (ITF). The samples are bundled within the ITF and said samples contain as sample events references to records within said samples to the corresponding big price data table (BDT). Each sample event refers in a preferred embodiment of the invention to a single element or record within BDT.

Because the number of different quantile vector elements is relatively small and always limited, the quantile vector can in an embodiment of the invention e.g. be associated to a quantile ID that is being expressed via a 2 byte smallint value or a 3-byte value (i.e. a composite of a tinyint and a smallint value) or a 4-byte integer (int) value or a int and a tinyint or a int and a smallint.

In another embodiment of the invention the quantile vector values are not included within the ITF, but only in the Index-ID table that is also managing the offset points and content ranges. Furthermore, because a sample consists of references to price data with the same quantile vector, all references to said price data can be put into one column or cell of the same record that is then associated to a given quantile vector.

Furthermore, the ITF structure is consisting only of 1 (with sample references) or 2 (with Quantile ID) or 3 (with Quantile ID and Sample ID) columns; additionally, the index-table-file (ITF) index can either be a part of that index-table-file or part of another index file or can be managed within a DB table, as e.g. mentioned before with the Index-ID table. All embodiments of said index-ID are being designed to manage data that point to the byte position (offset point) of the values related to said sample reference values within said index-table-file.

The references within the sample reference column of the ITF can either be a list of binary values with references to DB records or file records or it can be a list of PK values used in records within the price data table/BDT or said references can be realized with a compressed list with an internal structure that allows the description of ranges of price data or equivalent data or a compressed list of PK values or a reference to a file in the file system with sample references. The interpretation of said reference related content can be made dependent of an additional type column/cell within said record in with e.g. 'A' representing ASCII content, 'B' binary content, in particular compressed binary content, and F the path to a file in the file-system or an algorithm is interpreting said content and is assigning the content type to said column/cell automatically.

Furthermore, the data within the compressed data structure of the sample references can be described and or being used in different ways, e.g.: it can contain the stock ID and a trading day ID, which can be realized as a sequential value, which can then be further structured with another timescale like minutes or hours within the corresponding trading day. An alternative method is to use PK value representing a stock symbol and a PK value for the trading day. Another alternative method is to use a composite PK value for the stock symbol and the trading day. Additionally, the references can contain a time-value, i.e. a minute value which can then also be used to remove data before the starting time within the price array stored within a cell related to a price data record.

Furthermore, the big price data table (BDT) can be structured in a way so that each table record is being uniquely identified by a stock ID and a trading day ID, whereby multiple OHLC and volume price data are stored with corresponding time identifying value within a single column/cell. The values within the single column are either binary values or they are a compressed list with an additional internal data structure identifying each type of the value uniquely. In another alterative implementation, the stock-ID and trading day record can contain multiple columns/cells for storing compressed OHLC price data, e.g. for every 10, 15 or 20 min in order to have compressed data which are below 8000 bytes as that is a typical maximum size for data stored directly in a database.

In another embodiment of the invention the binary data are transformed into a non-binary text using a method from e.g. base64, which is a group of binary-to-text encoding schemes that represent binary data in an ASCII string format by translating it into a radix-64 representation.

In a preferred embodiment of the invention, real-time query for a sample is according to the invention accomplished in the following way: the system receives e.g. quantile vector values and or a reference to the quantile definition (e.g. via a quantile ID value, which can preferably be calculated from quantile vector values). The system according to the invention associates e.g. the quantile vector values and or the quantile ID value to a value that is being used within the index-table-file (ITF) or within the index-ID table as a primary key.

Alternatively, the system according to the invention calculates from the quantile vector element values the corresponding quantile ID, which is then also being used as the PK within the Index-ID table, from which an access unit can receive a file name identifier, an offset and range value that is being used to extract references to a sample as provided by the big data table (BDT). In an alternative embodiment of the invention the primary key is a composite key of the Quantile ID and unique value for the used quantile vector definition.

In another alternative embodiment of the invention the Index-ID table or the usage of any alternative embodiment for managing the references to the ITF file, the offset points and the data ranges (the alternatives are in all different implementations are referred-to in this invention as Index-ID table) is also able to manage multiple samples and corresponding offset values and ranges, and the columns/cell within the Index-ID table can contain within a said column/cell a list of offset points and range values provided in an ASCII coding or it can contain a compressed list in a binary format or a text format after a binary to text transformation or it can contain a path to a file with more samples either in ASCII, or Binary compressed format or in text after binary to text transformation.

The interpretation of said content can be made dependent of an additional type record within a column/cell whereby said record with e.g. 'A' is representing ASCII content in content cell, 'B' binary content, in particular compressed binary content, or text from a binary to text conversion and F the path to a file in the file-system or an algorithm is interpreting said content and is assigning the content type to said column/cell automatically.

The system according to the invention extracts for the quantile vector values within the query of the Index-ID table a single corresponding offset point for the sample reference records together with the length of said records occupying in the ITF. If the Index—ID table is providing reference data for multiple different samples, then an embodiment of the invention allows a random selection of a single data reference record to a sample consisting of a single offset point and a single range value, which are preferably integer values.

Additionally, a reference to a data range within the ITF can also contain a value related to the filename in which the sample is being stored. In a preferred embodiment, this additional value can be a sequence number or order number which is being part of the filename of the corresponding ITF or it is a number or GUID or a string which can be associated to a filename via an additional query to a DB or a file. In a preferred embodiment of the invention the system is initiating or executing a byte range download within the selected ITF, which then provides only the requested sample reference data, i.e. the references to the price data within the price data table/BDT.

In an embodiment of the invention the extracted content from the ITF can be binary content and or data compressed content or binary to text transformed compressed data. From the extracted data a sample, i.e. potentially a subset of the data is being extracted either directly or after decompression or after text to binary and decompression. In an embodiment of the invention, between e.g. 10 to 10000 sample reference values or sample events or a subset of the sample of a predetermined (i.e. selected, calculated, or set by user or by default) size or maximum or minimum size is being selected and or being extracted.

The extracted data are being decompressed, before sample being made available to be used within the next query on the BDT and or within the single joined SQL view. Then the sample references (in the following considered BDT PK values, which will also include alternative implementations for said sample references) within the sample are being stored in a preferred embodiment of the invention within a temporary or regular reference table of the BDT, i.e. within a, in the following called, query table, which is in a preferred embodiment of the invention within the same database as the price data table/BDT. In an embodiment of the invention, the query table contains sample references to a composite key consisting of the stock ID and trading day ID to price data records, in which the OHLC price data are being stored in a compressed array within a column and/or cell or stored in multiple compressed arrays within multiple columns and/or multiple cells.

In another embodiment of the invention, the database system has e.g. already a SQL view defined or a sample query system or sample query unit that is creating a SQL view (which will also include alternative implementations for said view like inner joins or the like known by experts skilled in the art) that contains the query table and the price data table/BDT with an inner join on the stock ID and the trading day ID with the BDT. In an alternative embodiment of the invention the inner join is being done to a composite key consisting of an object (i.e. a thing or an item or an entity or a value or number generating function with properties or attributes) related key, and a time-related key.

Then a single query on said SQL view is creating a list with all sample events or sample event related time-series that are contained within the price data table/BDT as output values within a single column/cell as a compressed price data or within multiple column/cell as multiple compressed price data or within time-series records with uncompressed structured price data. In an alternative embodiment of the invention the output data can be property or attribute data of an object given for a time-series, which were stored within BDT related to each record or row of said table.

In a special embodiment of the invention, the index-table-file is e.g. stored on a remote file-server that allows a byte-range download access. One of these remote file-servers is AWS (Amazon Web Server), S3 (Simple Storage Service), Google Cloud Storage, or Azure.

In another special embodiment of the invention, the database with the price data table/BDT is then managed on a server that has e.g. a fast solid state drive (SSD) allowing fast queried on stored data or it is a database within a fast RAM memory of a single server or it is distributed over the RAM of several servers operating segments of said BDT table as an independent database instance. An advantage of a setup of said database on SSD or in RAM memory is that the query on said price data table is done very quickly. The data extracted from the index-table-file (ITF) is typically between 2 KB and 100 KB which is small enough to be transferred to another database server using an electronic data network and which can then be decompressed on the destination server or a special server or service instance and quickly inserted into a corresponding query table on said same DB server that is managing said BDT or is a corresponding part of said BDT.

The price data table/BDT is then being queried via the SQL view one time for every single client query or user request for a new sample. The data queried from the query table are compressed and are in average about 1-8 KB per record or per sample event, which means that the totally extracted data packages from said single query is in total typically 1-80 MB.

In another preferred embodiment of the invention the data received from the query of said SQL view contains sample event data which are structured with an additional segmentation of sample into distinct subset of said sample, whereby each subset or bucket consists of multiple single sample event records, which are together turned after processing within an outcome determination unit into a single probability value or record after each outcome of each sample event within said sample bucket has been determined.

Additionally, an average over all single probability values is being calculated using the different probability values from the different buckets of a given sample and a standard deviation is being calculated for the probability values using the average probability and associated to the statistical error related to said average probability and outputted as probability and statistical error of said sample.

In another embodiment of the invention the system is using or creating one or more new temporary query tables for each sample and is storing the content of the sample references and querying said table within SQL View and deleting or purging said table after the query.

In another embodiment of the invention the index-table-file is be segmented into files of 4 GB or smaller so that a single 4-byte integer value is being used to address the offset position for the byte ranges access to data within the ITF. In said embodiment, the index-table-file index or index-ID table manages several index-table-files via using corresponding file names, which would be done either within the index-table-file index or within a database managing that index as mentioned with the Index-ID table. Moreover, the index-table-file and the corresponding index-table-file index (or Index-ID table) can have a proprietary file or data structure or compressed data structure that allow for additional optimization and or consistency checks and or updates.

In another embodiment of the invention the index-table-files or index-ID table is being backed up independently from the price-data table (BDT) and the names of the index-table-files can contain additional reference data or metadata to the version of the stored price data and/or data related to the used quantile definition and/or data related to the account owner that is using said quantile definition.

A file server service like S3 is usually considered an object store and data access is done by loading the entire object into a server that is processing the data. Because a segmentation of the index-table files into single quantile vector value pieces would generate too many files and loading files with several quantile vector references into a server would take too much time, the byte range access is an efficient compromise or trade-off to avoid having a quantile-vector specific price-data index close to or within the database together with the price data table.

In another embodiment of the invention, the ITF files are created around a common part or data segmentation of the quantile vector definition. For example, the ATR, volume, and price category are indicators that are related to the expected volatility of a stock and usually can be considered the part of the quantile vector that is not so much changing during a trading day. The corresponding quantile values can be included in the filename of the ITF and only sample references for quantile vectors can be included in the corresponding file content that share said volatility-related quantile values.

The solution according to the invention accommodate the simple use of different quantile vector definitions and the use of price data from different time-frames or from selected time values within the sample references and within its generation of the ITF and the use of different price data records using different time frames, like 1 min, 1 second or even tick-by tick data structures within BDT.

The solution according to the invention consists of a 2 step process: a pre-processing of the ITF generation and Index-ID generation or its update of ITF and Index-ID and a real-time query in order to get an access to sample references with the use of the Index-ID table and access to ITF using data from the Index-ID access together with a consecutive use and query of the extracted sample references from ITF in a query unit using a SQL view that provides results out an output with detailed times-series data or compressed time-series data from BDT.

In an embodiment of the invention the quantile vector is consisting in average of 5-7 indicators using 5-7 corresponding quantile operations for its associations. All price data in BDT are available for real-time access: i.e. all daily 1 min price-data for a single symbol and on a single trading day would be received from a single query via the query unit, i.e. within one record or array, potentially compressed and potentially binary to text transformed within a cell or column or within multiple cells or multiple columns.

Stock ID and trading days can be represented by 2 small-int values. Both values can then be turned or transformed into an integer value. The actual price-value(s) are being stored in an array of time, OHLC (open, high, low, close) prices+volume+additional data related to stock split and earning announcements related to said trading day. The array of intra-day data can in an embodiment of the invention e.g. be compressed and only uncompressed when used by the real-time data processing algorithms (i.e. for an outcome determination, expectation value calculations and/or price distribution and/or any other type of statistical analysis).

In another embodiment of the invention not all indicator values, but only a predetermined (i.e. selected, calculated, or set by user or by default) range of indicator values are assigned to quantile values, whereby non-assigned indicator values imply also that no corresponding quantile-vector is being generated and therefore no probability data are being calculated in the outcome determination unit. According to this solution, the range of acceptable indicator values is part of the quantile-vector definition and is being used on the client when generating the quantile-vector and on the server when creating the tables and or files used to extract samples for said quantile vector.

In another embodiment of the invention updates to the samples references are done via storing said additional sample references within a column/cell of the index-ID table. In said column/cell the content can have an ASCII coding or it can contain a compressed list in a binary format or a text format after a binary to text transformation or it can contain a path to a file with more samples either in ASCII, or Binary compressed format or in text after binary to text transformation.

The interpretation of said content can be made dependent of an additional type record within a column/cell whereby said record with e.g. 'A' is representing ASCII content in content cell, 'B' binary content, in particular compressed binary content, or text from a binary to text conversion and F the path to a file in the file-system or an algorithm is interpreting said content and is assigned content type to said column/cell automatically. Furthermore, updates can then be transferred by processing the ITF files with content from said update column/cell and content from said update sells is being moved, i.e. copied to the corresponding sample reference content within the ITF file and deleted from said update column/cell from the index-ID table. The exiting and updated data can also be compressed and binary to text transformed.

In another embodiment of the invention content from the calculation of probabilities or statistical data based on the extracted sample data are being stored in a result column/cell of the index-ID table. Additionally, in another embodiment of the invention content from the additional statistical data based on the extracted sample data, which were not being calculated in an early calculation of results can be stored in a result update column/cell of the index-ID table or the content of the result column/cell of the index-ID table can be updated. Additionally, the data describing the methods used to calculate the results or formats or metadata or scope of support for calculated statistical data can be stored within the result column/cell of the index-ID table or it can be stored in another result metadata column/cell within the index-ID table or being stored in another index-ID metadata table.

In another embodiment of the invention content from the calculation of probabilities or statistical data is being stored in an additional file that has the same data structure of ITF files and data related to the filename, data offset point and data range is being stored within the Index-ID table or another table with the same structure. The result files storing the results of the statistical data processing have a structure in which each result of said statistical data is being using a format own in XML or JSON or any other comparable structure that allow algorithm to extract stored data from said data structure. Additionally, the data structure of results can be compressed and additionally binary to text transformed sored in said result file.

The content of the result data structure can consist or contains of probabilities of hitting a given target price, or stop loss price level or said probabilities for a list of target price, stop loss price level and or for different timeframes or for said data for a given bias or expectation data calculated for each time-step or price separation data separating bias values, or price distribution from corresponding samples or isoline probability data and or corresponding first and second standard deviation and or said data from different risk-to-reward ratios and or it can consist or contain any combination of above data or subset of said data for different time-frames, risk-to-reward ratios or trade biases like very bearish, bearish, neutral, bullish, or very bullish. All above result data are being calculated for a given quantile-vector value from a corresponding sample.

In said result column/cell or data structure the content can have an ASCII coding or it can contain a compressed list in a binary format or a text format after a binary to text transformation or it can contain a path to a file with more samples either in ASCII, or Binary compressed format or in text after binary to text transformation. The interpretation of said content can be made dependent of an additional type record within a column/cell whereby said record with e.g. 'A' is representing ASCII content in content cell, 'B' binary content, in particular compressed binary content, or text from a binary to text conversion and F the path to a file in the file-system or an algorithm is interpreting said content and is assigned content type to said column/cell automatically.

Furthermore, updates can then be transferred by processing the ITF files with content from said update column/cell and content from said update sells is being moved, i.e. copied to the corresponding sample reference content within the ITF file and deleted from said update column/cell from the index-ID table or from additional files used to manage additional or updated statistical data.

FIG. 1 is a schematic software architecture model to extract sample data. In the illustrated embodiment, the input unit 10 receives data from a client or other source. In some embodiments, the data includes a quantile vector/array. In other embodiments, the data includes information useful in the extraction of sample data from a big data table (BDT). In the illustrated embodiment, the data from the input unit is transformed by an input transformer 20. In some embodiments, the input transformer 20 associated the input data with an identifier or key. In some embodiments, the key includes a filename and an offset associated with a location within the file identified by the filename.

In the illustrated embodiment, a file, offset, and range determination unit 30 extract file, offset, and range data from the key. In the illustrated embodiment, the file, offset, and range determination unit 30 organizes the extracted data to correspond to an index-table file format and an associated file location format to access additional data related to the sampling from an index-table file. In some embodiments, the sample data include specific sampling events.

Furthermore, the file, offset, and range determination unit 30 provides offset values and a data range value on the index table file (ITF). The offset is the byte position within a file with the extracted filename. In some embodiments, the range is the size (e.g. in number of bytes) that the system is extracting from the file via a byte range download.

In some embodiments, the extracted data from the file, offset, and range determination unit 30 are communicated to a file server query unit 40. In some embodiments, the file server query unit 40 applies the extracted data to identify sample events stored on a file server 50. In some embodiments, the file server 50 includes one or more non-server storage location or devices operating alone or in concert.

In some embodiments, the data identified by the file server query unit 40 are either binary values representing references to records in a big data table (BDT) or compressed data in which the references to records in the big data table are described or encoded using a meta language or XML or via a JSON structure. In some embodiments, the data extracted from the file server 50 are then transformed, by a data transformation unit 55, into a list of references. In some embodiments, the data transformation unit 55 provides the list of references to a query preparation unit 60 which stores, on the same database that manages the big data table (BDT), the references within a query table (QT) which is then part of a common SQL inner join or SQL view on the illustrated storage location 75.

The illustrated embodiment also includes a big data table query unit 70. In some embodiments, in the big data table query unit 70, the SQL view or inner join is queried with a single query. In some embodiments, the big data table query unit 70 extracts multiple records in response to the query. In some embodiments, the multiple records include multiple time-series. In some embodiments, the multiple time-series are each compressed separately. In some embodiments, the multiple time-series correspond to several event-elements within the extracted sample. In some embodiments, the illustrated response preparation unit processes the extracted sample results 90 for the output and/or further statistical or other computational analyses.

Figure 2:
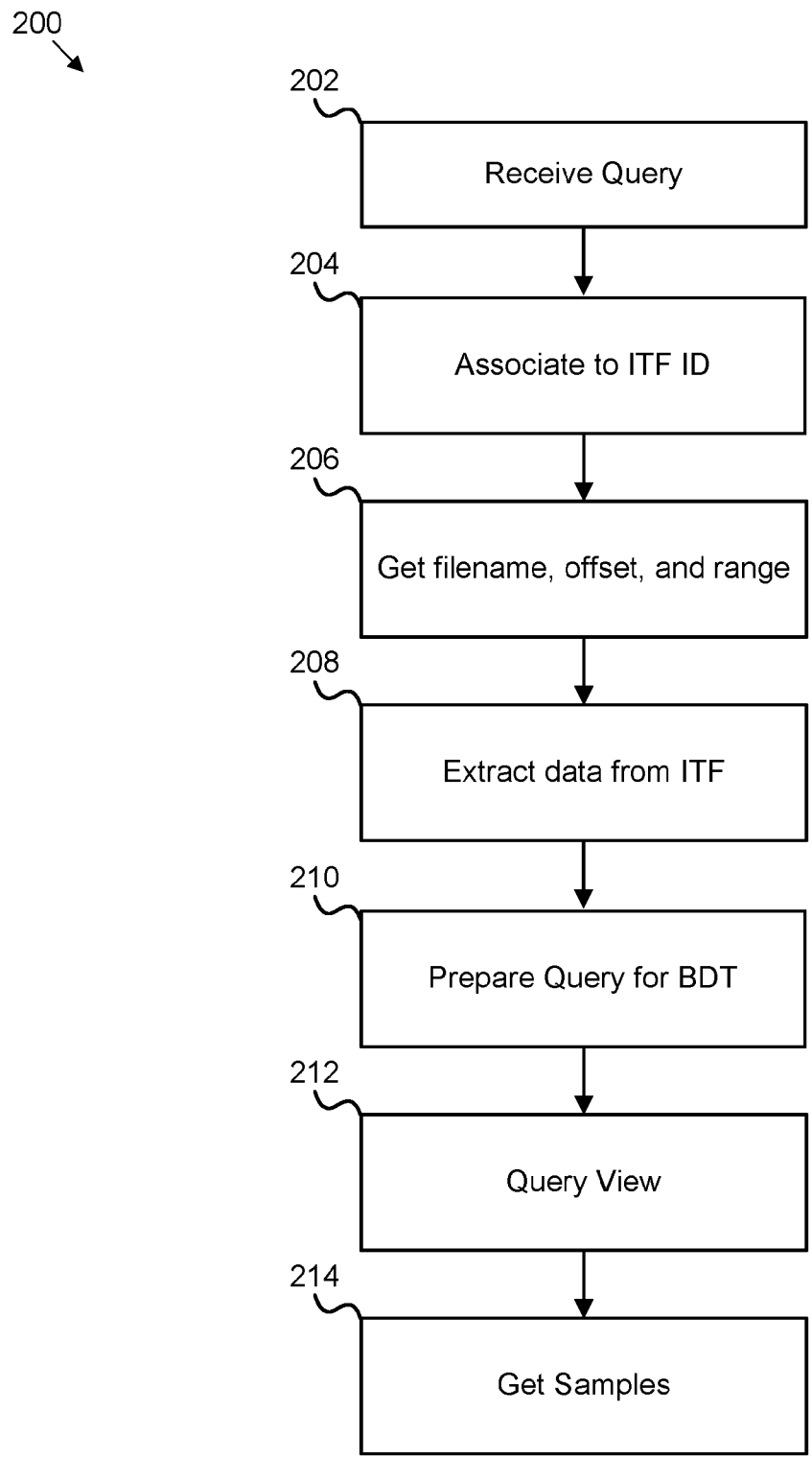
FIG. 2 is a flowchart diagram of a method to obtain sample data.

FIG. 2 is a flowchart diagram of a method 200 to obtain sample data. At block 202, data corresponding to a query are received. At block 204, these data are associated with an identifier (ID) or key that is used within the index table file (ITF). In some embodiments, the key is a primary key. At block 206, the key or ID is used to extract the file name, offset, and range from a database table on which data related to the sample and to the received data are stored. At block 208, the data are then extracted from the file (ITF) via a byte range download.

At block 210, the extracted data are transformed into a list. Further at block 210, the list is prepared for querying the BDT. In some embodiments, the data are stored to a query table. At block 212, the query table is used, in conjunction with the BDT, to form a single joined SQL view. At block 212, the view is queried using a query ID that is introduced in the query table at block 210. At block 214, the sample data are fetched out of the database. In some embodiments, the data fetched from the database are later used for additional data processing.

Figure 3:
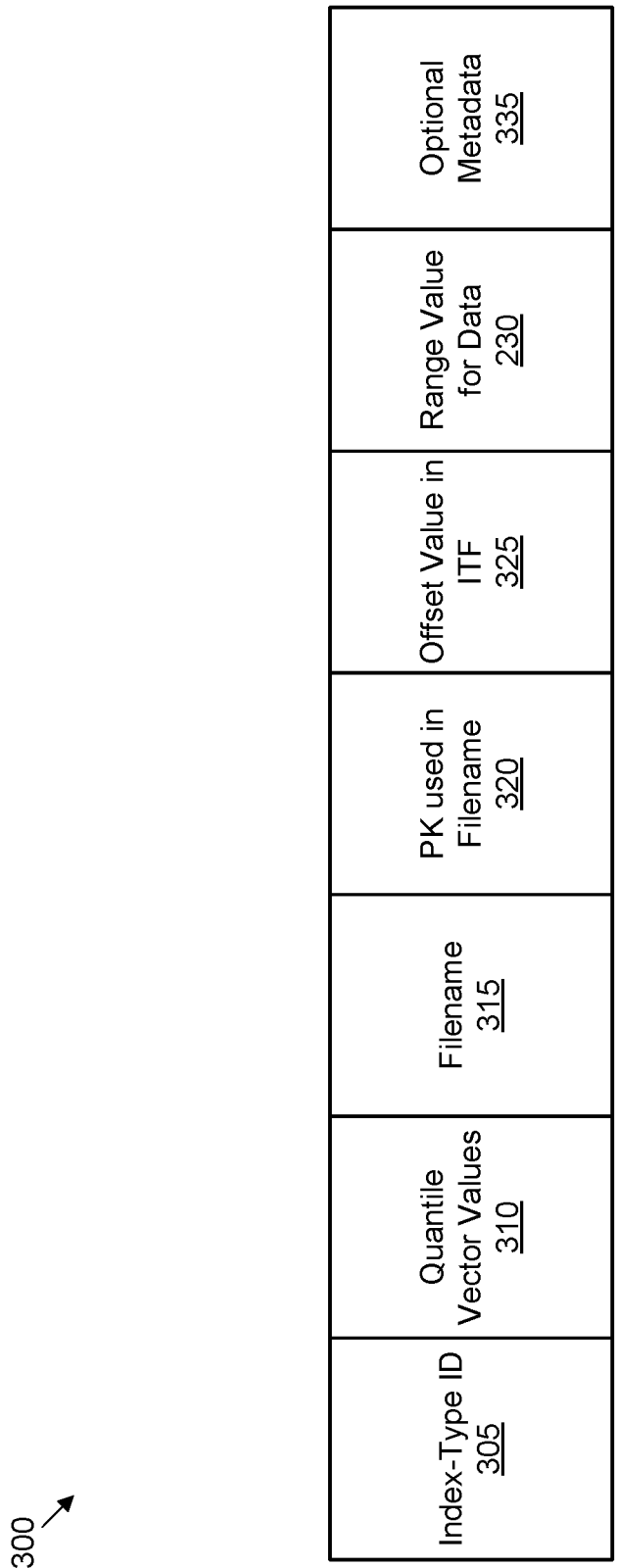
FIG. 3 is a schematic block diagram of one embodiments of an index table/ITF index structure.

FIG. 3 is a schematic block diagram of one embodiments of an index table/ITF index structure 300. In other embodiments, the illustrated structure is referred to as an index ID table. In some embodiments, the index table 300 stores each record which is identified by a reference to an index type identifier 305. In some embodiments, the index type identifier 305 describes the structure of the quantile vector. In the illustrate embodiment, the index table 300 also includes quantile vector values 310 within/from a quantile vector, which together can serve as a primary key.

In the illustrated embodiment, the actual index table file (ITF) is represented by a filename 315. In some embodiments, the filename 315 is also a reference to some other table and a primary key (PK) 320 that represents and references the content within the ITF for that quantile vector/array value. In some embodiments, the primary key 320 is optional. In some embodiments, the primary key 320 is optional because the offset value 325 identifies the starting position of the content within ITF sufficiently. In some embodiments, the range values 330 are used to describe the length of the content to be extracted within ITF.

In some embodiments, the optional metadata 335 contains metadata or filed data used for updates or describing the type of data related to the stored sample reference content. For example, type of data structure used or the type of compression used. In some embodiments, each of the elements of the index table 300 may be combined in one column/cell and data from each of the elements may be included within a combined data structure either stored in ascii or in binary code or in text transformed from binary or as a path to a file stored in a filesystem.

Figure 4:
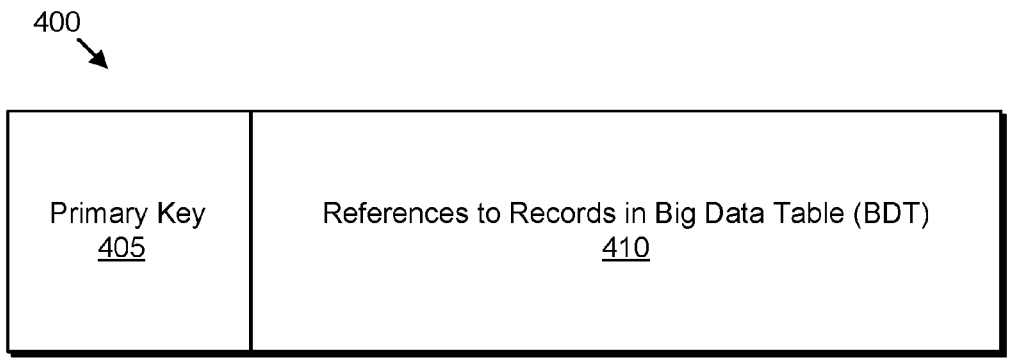
FIG. 4 is a schematic block diagram of one embodiment of an index table file (ITF) structure.

FIG. 4 is a schematic block diagram of one embodiment of an index table file (ITF) structure 400. In some embodiments, the structure 400 corresponds to a location within the index table 300 described above with respect to FIG. 3. In some embodiments, the structure 400 is located at a corresponding offset point within the index table 300 of FIG. 3.

In the illustrated embodiment, the structure 400 includes a primary key record 405. In some embodiments, the primary key record 405 is an optional PK record 405. In the illustrated embodiment, the structure 400 also includes references to records in a big data table (BDT) 410. In some embodiments, the references 410 contain sample references to records managed within the big data table (BDT) which is described in greater detail below with reference to FIG. 5. In some embodiments, the content within ITF is either binary with direct primary key (PK) references to BDT records or encoded with using a language or predetermined (i.e. selected, calculated, or set by user or by default) data structures. The content for each quantile vector value or sample reference from FIG. 3 can also be independently compressed.

Figure 5:
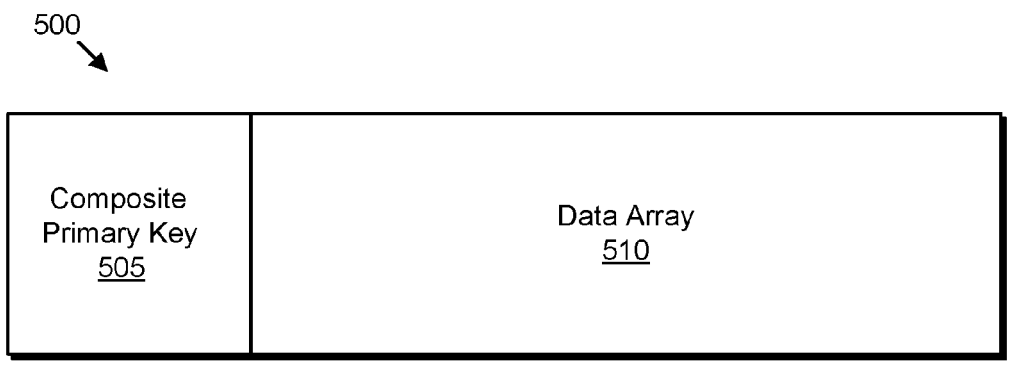
FIG. 5 is a schematic block diagram of one embodiment of a big data table structure 500.

FIG. 5 is a schematic block diagram of one embodiment of a big data table structure 500. In some embodiments, the structure 500 includes a mandatory primary key 505. In the illustrated embodiment, the primary key 505 is structured as a composite key 505 based on, for example, a reference to a stock identifier and to a trading day identifier. In some embodiments, the structure 500 includes a data array 510 which includes binary data. In some embodiments, multiple arrays of values (price data) or any other single or multidimensional data record. In some embodiments, the data array 510 includes content associated with price data given in a smaller time-frame. In other embodiments, the data array 510 includes OHLC data which can be independently compressed. In some embodiments, the data array 510 includes multiple column/cells managing different smaller timeframes with compressed content. In some embodiments, multi-dimensional arrays are included in the data array 510.

Figure 6:
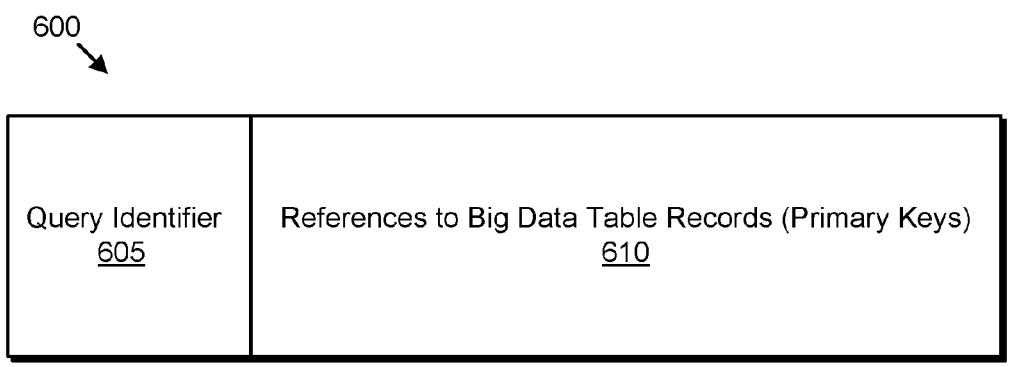
FIG. 6 is a schematic block diagram of one embodiment of a query table (QT) structure.

FIG. 6 is a schematic block diagram of one embodiment of a query table (QT) structure 600. In the illustrated embodiment, the query table structure 600 includes a query identifier (ID). In some embodiments, the query table structure 600 includes a query ID for all data related to the same sample. In some embodiments, each event within the sample has a corresponding reference in the references to big data table records 610 with a reference or a PK to a BDT record.

Further advantages and utilizations of the present invention is also obtained by having the index table file (ITF) containing additional category data references to the sample data references; or ITF contains additional data which are associated to categories, which are being defined via using data managed via columns or tables with additional details for said categories, in particular derived from or associated to content that is protected against direct read access due to data privacy considerations.

In an embodiment of the invention, the ITF files/tables and its content are being made openly accessible via an electronic data network—and are operated on an potentially open server, called server A, while the content on a DB with a the big data table has detailed data worth additional protection (i.e. a protected BDT), i.e. it is containing potentially detailed data e.g. raw data that require protection because of data privacy, whereby these protected BDT data are managed on a protected server B.

In special embodiment of this invention, server B, on which the big table with protected data (protected BDT) is being operated is on an entirely access-protected system or domain. In said embodiment, the big table with the protected data can be processed on server B in a way so that the ITF data are referring only to aggregated data using said protected BDT values so that no confidential details have to leave the premise of the protected server B or the protected domain; once the index table file is being generated on the protected system, i.e. on server B, it can be moved to the open server A without revealing confidential information about protected data on server B.

The quantile definition is then associated to underlying mathematical operations or indicators that can be used to generate aggregated values, while the quantile values within the quantile-vector are used to define the context or categories from which or in which the aggregated values have been calculated.

On server A, the index table file and/or a file or table with additional metadata can serve as a staging area for the sampling and the sample reference data can be accessed via server A (i.e. within an open area); once the sample is being selected and the corresponding data from ITF are being extracted, these sample reference data can be send to the server B for additional statistical processing. Because the access to the actual private data is happening on server B, the access happens reliably only through interfaces which can also be considered as filters through which the outsiders would not be able to see how or what is being stored on the server B. This means, the full structure, and the details of the data within the protected big table of data don't need to be disclosed to any outsiders when users are requesting context dependent samples for statistical data analysis.

Moreover, the access to data happens through sample reference data, which can contain additional data describing the kind of data to be derived or calculated from the raw data on server B. Therefore, the requested data on server B doesn't have to be already calculated or prepared, but they can already be stored on server B.

In another embodiment of the invention, additional metadata provided within the description of ITF on server A could additionally allow merging data from different sources in a protected way. The final statistical analysis can be done on a trusted server C, which would aggregate data from multiple server of a type like server B into one single report.

In another embodiment of the invention, the access to data and the exploration of data could be provided on server A using descriptive data from server B, in which the user could determine e.g. how many data records would be available for the sampling and what kind of context, i.e. indicator and quantile definitions are being supported, together with more detailed description of the available data in form of metadata.

Additionally, data providers are then being protected against privacy problems (like data privacy, copy right violation, data piracy and a general loss of access control when giving user direct access, etc.) resulting from a direct access to said data by users who are only interested in aggregated, statistical data. Records from the big table with its more detailed data can thereby remain hidden, while access to data for research can be made available for data scientists without potential regrets by the content owners.

In another embodiment of the invention the temporary generation of the sample reference or query table on the BDT database and the corresponding use or creation of a SQL view allows a very quick access to the entire sample of time-series data with one single query, which is making use of the optimized capabilities to extract data via inner joins from a large table on existing relational database management systems instead of querying thousands of single records from the price data table/BDT.

In another embodiment of the invention the total size of the index-table-files (ITF) is being reduced to 1/10th or 1/20th or even less of the original price data table. Moreover, in a preferred embodiment of the invention, the ITF is being segmented in several smaller files and the name refers to the corresponding Quantile Definition/Type ID values together with a sequence number or GUID value making said file name unique.

In another embodiment of the invention the ITF files are being stored on a distributed file-system server, like AWS S3, on which the files are being distributed over many servers. In order to avoid that all ITF files related to one index are being managed on one file-server, the names of said ITF's are either being randomized or a GUID is being used or the order number is being taken first and then followed by a name representing the Quantile Definition/Type ID which is reducing the probability that ITF files from the same Quantile Definition/Type ID are being stored on the same file-server.

Storing the large index-table file (ITF) on a regular file server instead of the more expensive SSD or HDD has also huge cost saving implications. Moreover, storing a segmented index-table file in smaller segments is much cheaper on S3 than storing it closely to the database server; furthermore, using a service like S3 saves also costs in compare to the more expensive DB, which is always coming with an additional corresponding size, performance, and cost overhead.

In a special embodiment of the invention only the filename, offset points and ranges which are used for accessing samples in ITF are e.g. managed by a DB table, i.e. e.g. the Index-ID table, which is very cheap due to the few data to be stored. Additionally, the access to the index-table files on a S# type service is a comparable rare event, means it happens only every few minutes per user query related to their limitations on their probability data stream subscription. Therefore, the SSD storage capabilities is not sufficiently utilized if the ITF files would be stored on said SSD devices. Instead, the price data table/BDT is more intensively being used; potentially it is being used several thousand times per second and therefore price data table/BDT and query tables with SQL views are much better utilizing a fast SSD system.

In another embodiment of the invention not all indicator values, but only a predetermined (i.e. selected, calculated, or set by user or by default) range of indicator values are assigned to quantile values, whereby non-assigned indicator values imply also that no corresponding quantile-vector is being generated and therefore no probability data are being calculated in the Outcome determination unit. According to this solution, the range of acceptable indicator values is part of the quantile-vector definition and is being used on the client when generating the quantile-vector and on the server when creating the tables and or files used to extract samples for said quantile vector.

The preceding depiction of the collaborative CAx applications and other inventive elements described herein are intended to be illustrative rather than definitive. Similarly, the claimed invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for obtaining sample data, the method comprising:
    associating data extracted from an incoming query to a key corresponding to an index table file;
    downloading data corresponding to a sample based on reference data describing a filename, offset, and data range for the sample, the reference data obtained from a table entry corresponding to the key, the index table file comprising the sample and an index ID table comprising the table entry with the reference data for the sample, wherein downloading the data comprises performing a byte range download to obtain the data from an index identifier table based on the filename, offset, and data range;

inserting the downloaded data corresponding to the sample to an inner join between a query table and a big data table, the big data table comprising complete data, wherein the complete data is pre-processed to access the sample stored to the index table file and to populate the index ID table with the reference data, the query table sharing the inner join with the big data table;

obtaining the complete data corresponding to the sample based on the inserted data from the inner join in response to the incoming query; and storing the complete data corresponding to the sample to a file associated with a user account.

2. The method of claim 1, wherein the complete data corresponding to the sample comprises time-series data for the sample.

3. The method of claim 1, wherein the complete data corresponding to the sample comprises price record data for the sample.

4. The method of claim 1, wherein obtaining the complete data corresponding to the sample further comprises receiving a binary-to-text transformed and compressed data record.

5. The method of claim 1, wherein obtaining the complete data corresponding to the sample further comprises receiving a binary compressed data record.

6. The method of claim 1, wherein the inner join between the query table and the big data table forms a standard query language view.

7. A computer program product comprising a computer readable storage medium having program instructions embodied therewith, the program instructions readable/executable by a processor to cause the processor to:

associate data extracted from an incoming query with a key corresponding to an index table file;

download data corresponding to a sample based on reference data describing a filename, offset, and data range for the sample, the reference data obtained from a table entry corresponding to the key, the index table file comprising the sample and an index ID table comprising the table entry with the reference data for the sample, wherein downloading the data comprises performing a byte range download to obtain the data from an index identifier table based on the filename, offset, and data range;

insert the downloaded data corresponding to the sample to an inner join between a query table and a big data table, the big data table comprising complete data, wherein the complete data is pre-processed;

obtain the complete data corresponding to the sample based on the inserted data from the inner join in response to the incoming query; and store the complete data corresponding to the sample to a file associated with a user account.

8. The computer program product of claim 7, wherein the complete data corresponding to the sample comprises time-series data for the sample.

9. The computer program product of claim 7, wherein the complete data corresponding to the sample comprises price record data for the sample.

10. The computer program product of claim 7, wherein obtaining the complete data corresponding to the sample further comprises receiving a binary-to-text transformed and compressed data record.

11. The computer program product of claim 7, wherein obtaining the complete data corresponding to the sample further comprises receiving a binary compressed data record.

12. The computer program product of claim 7, wherein the inner join between the query table and the big data table forms a standard query language view.

13. A computer system comprising:

a processor;

a memory accessible by the processor; and a computer readable medium having instructions encoded thereon to:

associate data extracted from an incoming query with a key corresponding to an index table file;

download data corresponding to a sample based on reference data describing a filename, offset, and data range for the sample, the reference data obtained from a table entry corresponding to the key, the index table file comprising the sample and the index IS ID table comprising the table entry with the reference data for the sample, wherein downloading the data comprises performing a byte range download to obtain the data from an index identifier table based on the filename, offset, and data range;

insert the downloaded data corresponding to the sample to an inner join between a query table and a big data table, the big data table comprising complete data, wherein the complete data is pre-processed to access the sample stored to the index table file and to populate the index ID table with the reference data, the query table sharing the inner join with the big data table;

obtain the complete data corresponding to the sample based on the inserted data from the inner join in response to the incoming query; and store the complete data corresponding to the sample to a file associated with a user account.

14. The computer system of claim 13, wherein the complete data corresponding to the sample comprises time-series data for the sample.

15. The computer system of claim 13, wherein the complete data corresponding to the sample comprises price record data for the sample.

16. The computer system of claim 13, wherein the inner join between the query table and the big data table forms a standard query language view.

* * * * *